United States Patent [19]

Miller

[11] 3,815,782
[45] June 11, 1974

[54] PARTS ORIENTER AND FEEDER ASSEMBLY
[75] Inventor: Paul Marcus Miller, Largo, Fla.
[73] Assignee: Tangen Drives, Inc., Clearwater, Fla.
[22] Filed: Jan. 12, 1973
[21] Appl. No.: 323,070

[52] U.S. Cl. ............................ 221/160, 198/33 AA
[51] Int. Cl. .............................................. B65h 9/04
[58] Field of Search ........................... 221/158–162, 221/167; 198/33 AA

[56] References Cited
UNITED STATES PATENTS
| | | | |
|---|---|---|---|
| 959,454 | 5/1910 | Campbell | 221/161 |
| 2,725,971 | 12/1955 | Clark-Riede | 221/159 |
| 3,059,811 | 10/1962 | Lundberg | 221/167 |

Primary Examiner—Robert B. Reeves
Assistant Examiner—Thomas E. Kocovsky
Attorney, Agent, or Firm—Dominik, Knechtel, Godula & Demeur

[57] ABSTRACT

A headed parts feeder is shown for parts having a head and shank in which the head is sufficiently large and flattened so that it has stability in the inverted position. With the shank up, generally, the headed parts are rotated in a rotary conical member having a circular wall surrounding the same. A tangential plow engages the wall to direct the parts away from the wall to an inclined ramp which carries the parts upwardly. A bar member is positioned above the ramp and overlying the same which engages either heads or shanks which are not properly oriented. The base of the inclined ramp is angled downwardly toward the other wall portion of the rotary feeder. Optionally, the bar member may be extended, thereby rejecting all parts and recirculating the same when a shut off is desired.

2 Claims, 10 Drawing Figures

PARTS ORIENTER AND FEEDER ASSEMBLY

CROSS REFERENCE TO RELATED APPLICATIONS

There are no applications pending or patents issued to which this application relates except as those illustrative of the prior art which will be discussed hereinafter.

BACKGROUND OF INVENTION

1. Field of Invention

The invention relates to the field of feeding parts, whether small or large, in which a rotary conical drive member is employed with a circular wall surrounding the same. Such part feeders are made and sold under the trademark "CENTRIFEED" by Tangen Drives, Inc., of Clearwater, Florida, the assignee of this application. The advantage of such feeders is that the rate of feed or parts is a function of the peripheral speed of the rotor, and when a large rotor is driven at a significant feed rate, parts can be fed at the rate of 500 to 1,500 per minute which is significantly faster than vibratory feeders or other type feeders.

2. Description of Prior Art

The prior art is generally exemplified by applicant's assignee's U.S. Pat. No. 3,658,207. Headed parts feeders, where the head is small in relation to the length of the shank, will not permit the feeding of parts unless the shank hangs downwardly, and a pair of guide rails, or driven counter rotating shafts, receive the part as the same is fed from the rotary conical feeder. Thus the shank is invariably oriented in the downward position in the feeders of the prior art. Where the head of the part is substantial in size, with the proportions of a mushroom but with the head sufficiently flat so that the same will rest on the flat, it is difficult to tumble the same and put them onto parallel rails, particularly at a feed rate of the type contemplated by the present invention, and with 100 percent proper orientation at all times.

SUMMARY

The present invention stems from the discovery that headed parts which are stable with the head down and the shank upwardly can be fed at significant feed rates in a rotary conical type feeder if the same are plowed off, and angled upwardly on a ramp which, in turn, is angled downwardly at its inner portion toward the outer wall of the rotary feeder. In addition, a bar is provided above the angled ramp toward the wall side, and in overlying relationship with the angled ramp, and extending a distance such that when a part is not properly oriented as to both head and shank, the same will be bumped by the bar, or alternatively bumped into the bar, and be toppled off the inclined ramp and back onto the rotary feeder for recirculation, reorientation, and ultimate feeding. The part may be engaged at its peripheral edge toward the wall of the unit either on the shank or the head, for purposes of guidance urged by the tilting of the ramp, but the bar means for rejecting the disoriented part must be above the ramp and above the head of the part.

In view of the foregoing, it will be apparent that the principal object of the present invention is to speed feed parts having a head and a shank in which they are stable with the head down, fully oriented, and at feed rates of 500 to 1,500 units per minute.

A related object of the present invention is to provide the feed and orientation contemplated in a unit which is economically feasible, and in which the reject rate is relatively low thereby reducing the noise, tumbling of parts, and damage which may occur to the parts in the course of orientation and feeding.

ILLUSTRATIVE DRAWINGS

The invention will be more fully understood, and the objectives thereof, as the following description proceeds, taken in conjunction with the illustrative drawings in which.

Figure 7:
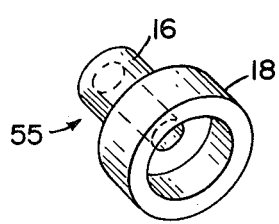
FIG. 7 is a perspective view of a larger part employed in an automotive starting system which can also be fed with a feeder embodying the present invention.
Figure 10:
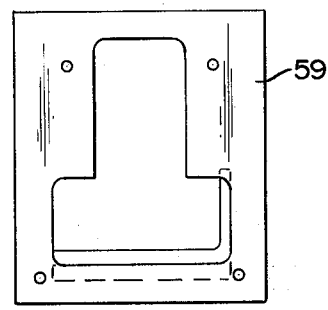
FIG. 10 is an end view taken from the right end portion of FIGS. 8 and 9 showing the discharge trap.

Two illustrative headed parts are shown in the two embodiments illustrative of the present invention. The first embodiment is shown in FIGS. 1 through 6, and the second embodiment in FIGS. 7 through 10. The headed part in the first embodiment is a hex head screw blank, generally shown in FIGS. 3 and 5. The particular part has an hexagonal shape slotted head which is five-sixteenths inch across the flats of the hex head. The shank is one-fourth inch long, and approximately one-eighth inch in diameter, with a thickness of three thirty-seconds of an inch. The second illustrative part, shown in FIG. 7, is for use on an automotive starter. Its overall height is 1⅞ inches, and the distance across the head is 1 3/16 inches. The shank diameter is 3¾ inches, and the shank length is 1⅛ inches. As will be observed, a portion of the head is hollow and the shank is hollow as well.

Figure 1:
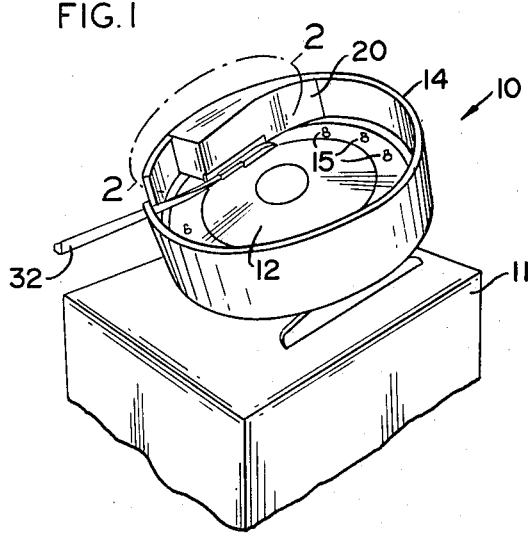
FIG. 1 is a perspective view of a typical feeder illustrative of the present invention showing the basic elements.
Figure 4:
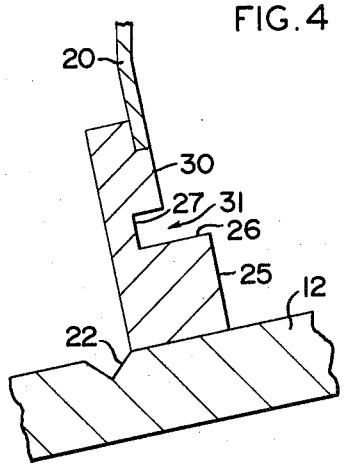
FIG. 4 is an enlarged transverse sectional view of the feeder incline ramp taken along section line 4—4 of FIG. 2.

Turning now to FIG. 1, where the first embodiment is shown, it will be seen that the feeder 10 is mounted on a base 11, with means for tilting the same from a position where the rotary cone 12 is aligned so that its axis of rotation is vertical, forwardly for approximately 20 to 30 degrees thereby controlling the feed rate. The rotary cone 12 is surrounded by a circular wall 14. The headed part 15, described above and shown in FIG. 3, has a shank 16 and a head 18. The terminus of the feeder is a cage mount 19 (see FIGS. 2 and 5) which receives the oriented parts and positions the same within a cage, tube, or magazine for oriented feeding for further purposes.

As the parts circulate in FIG. 1, in a counter clockwise direction, the parts 15 first are engaged by the plow 20 which is a vertical walled member curving tangentially to intersect the inner portion of the wall 15, and terminating in a flat face which delivers the parts to a pick off 21 (see FIG. 2) which is pointed downwardly into a pick off groove 22 of the rotary conical member 12. A wiper shield 24 (see FIGS. 2 and 5) assists in directing the parts for engagement after being picked up by the pick off point 21 for engagement by the inclined ramp 25.

Figure 5:
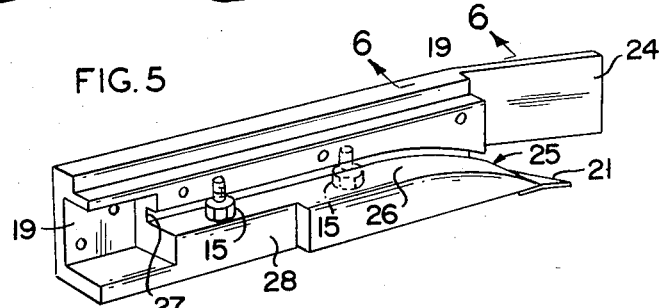
FIG. 5 is an enlarged perspective view of the feeder ramp taken generally in the area shown by the phantom lines in FIG. 1.
Figure 3:
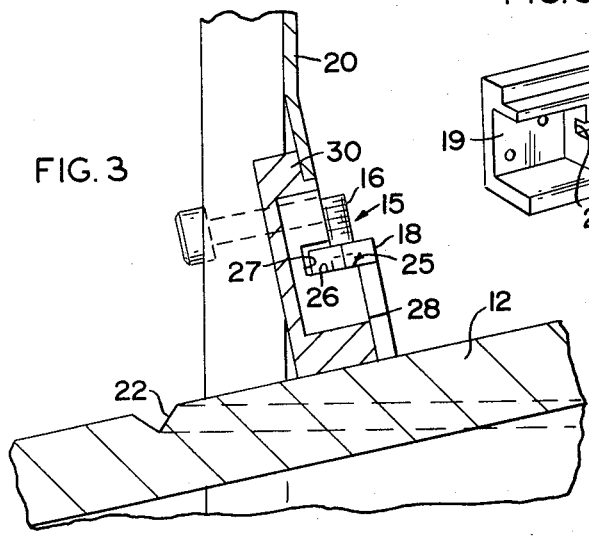
FIG. 3 is a transverse sectional view, enlarged, of the feeder track taken along section line 3—3 of FIG. 2.
Figure 6:
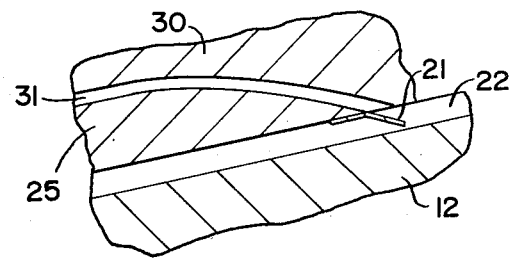
FIG. 6 is a longitudinal section view taken generally along section line 6—6 of FIG. 5.

As will be seen in FIG. 5, the pick off ramp 25 curves upwardly, however because the rotary cone is tilted forwardly as pointed out with regard to FIG. 1, the relative relationship is one of flat tangential and then downward sloping. The inclined ramp face 26 is further inclined (see particularly FIG. 3) toward the outside or downwardly so that the center of gravity of the parts 15 is such as to constantly urge it toward the bar 30. In this instance, the bar 30 contacts the shank 16 of the part 15, and the head rides flat on the top of the inclined ramp 25 and a short distance away from the inner wall of the inclined ramp 25 (see again FIG. 3). The ramp side wall 27 is so propotioned to achieve this result.

Figure 2:
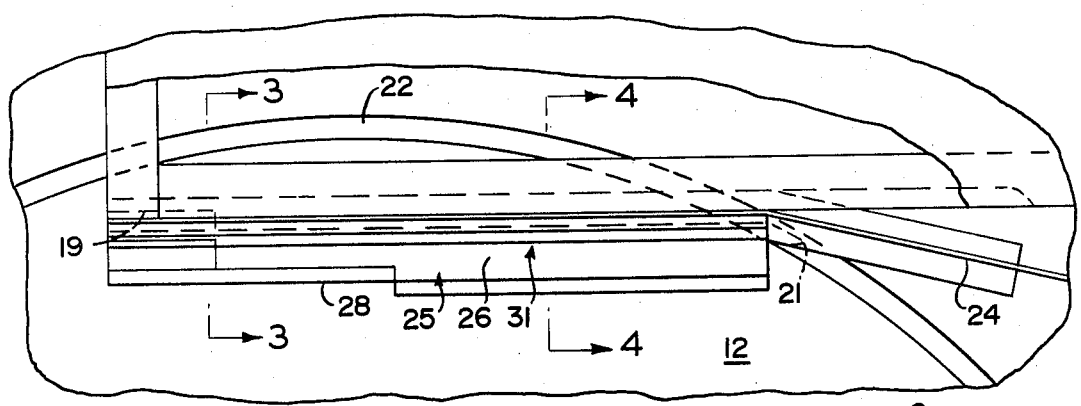
FIG. 2 is an enlarged top view of that portion of the feeder shown in phantom lines in the elliptical portion on FIG. 1.

As the headed part moves along the ramp 25 (see FIG. 2) a recess or offset 28 is provided to tumble those headed parts 15 which are already not properly oriented. As will be seen in FIG. 6, the undercut 31 defined beneath the bar 30 is such that it will begin orienting parts almost as soon as the same are picked up by the pick off 21, and with their flat heads engaging the inclined ramp 25. The parts then proceed to the cage mount 19 (see FIG. 2) where they are picked up in a cage or track 32 as shown in FIG. 1, and thereafter delivered for further processing. All of the headed parts 15 which are improperly oriented, as will be observed in FIGS. 3 and 5, will be deflected by the combined action of the bar 30 and the inclined ramp 25 since the center of gravity of the part (see particularly FIG. 3) is quite close to the outer edge of the inclined ramp 25, particularly after the part passes beyond the offset portion as shown in FIG. 2.

Figure 8:
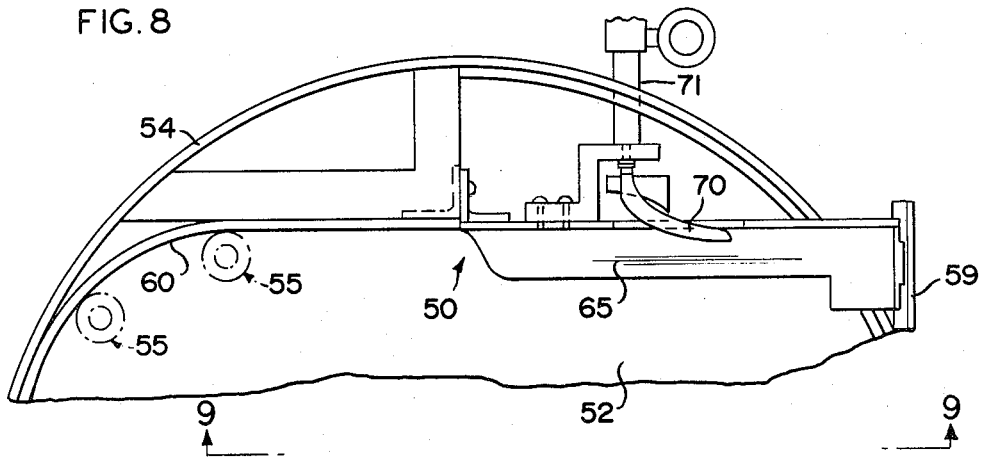
FIG. 8 is a top partially broken view taken in the same general location as FIG. 2 showing the alternative embodiment feeder.
Figure 9:
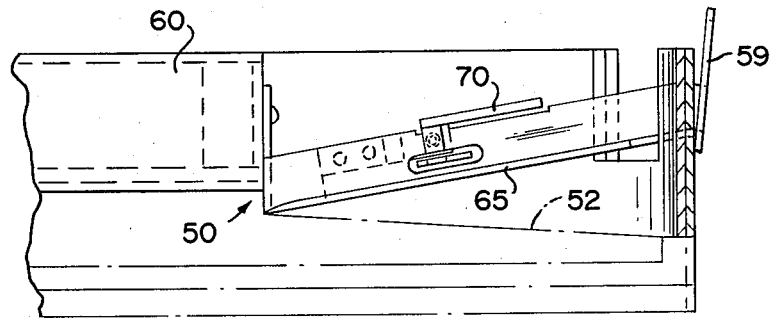
FIG. 9 is an enlarged partially sectioned view taken along section line 9—9 of FIG. 8.

In the alternative embodiment as shown in FIGS. 7 through 10, it will be seen that the same principles and structural elements may be employed with a significantly larger part 55 which nonetheless has a head 18 and a shank 16. In FIG. 8 it will be seen that the part 55 is engaged as it rotates (in this instance clockwise) by the plow 60 and thereafter proceeds upwardly on the inclined ramp 65. The rotary cone 52 delivers the much larger parts in substantially the same fashion as the small parts shown in FIGS. 1 through 6, and they thereafter proceed upwardly on the ramp 65 where those parts not properly oriented are tumbled by means of the bar 70. Those parts which are fully oriented thereafter are delivered to the cage mount 59, as illustrated in end view in FIG. 10, and may be then processed to be turned on their sides, inverted, or otherwise presented in an oriented fashion for further processing. In this embodiment, a bar actuator 71 presses the bar 70 into an extended overlying relationship with the ramp 65 where it is desired to recirculate all parts, and shut off the feed. The same technique of an extended bar may also be employed with the smaller type parts such as illustrated in FIGS. 1 through 6 inclusive.

In summary it will be seen that two different styles of rotary cone feeders have been shown, each of which selectively feeds a small or large headed part which is stable in the inverted position. The commercial feed rate is in between 500 and 1,500 per minute with recirculation in the order of less than 10 percent.

Although particular embodiments of the invention have been shown and described in full here, there is no intention to thereby limit the invention to the details of such embodiments. On the contrary, the intention is to cover all modifications, alternatives, embodiments, usages and equivalents of a headed parts feeder as fall within the spirit and scope of the invention, specification and the appended claims.

What is claimed is:

1. In a feeder for headed parts of the type having a shank and a head, and having stability when inverted and resting on the head, the feeder including a driven rotary conical member with its axis of rotation variable from the vertical to suit the desired rate of feed, and a circular wall around the rotary conical member, the improvement comprising in combination, a plow tangentially engaging the wall to direct headed parts away from the wall, a ramp inclined upwardly from the rotary conical member and supporting the headed parts for lineal travel, a bar member positioned above said ramp and overlying the same, positioned and proportioned to engage the shank or head of any headed parts not passing along said ramp with the head down and shank up and the head flatly engaging said ramp, said ramp being tilted towards said bar member urging properly oriented headed parts towards the bar member, and said bar member being shiftable upon actuation to deflect all headed parts from said ramp and recirculating all of the headed parts 2. The headed parts feeder as set forth in claim 1 above, which further includes a cage mount carried at the end of said ramp and a parts cage mounted on said cage mount thereby to collect and arrest parts as the same move from said ramp onto said parts cage.

* * * * *